United States Patent
McFarlin, Jr. et al.

(10) Patent No.: US 7,172,377 B2
(45) Date of Patent: Feb. 6, 2007

(54) ROUTER OR CUTTER BIT CHUCK OR EXTENSION

(76) Inventors: Robert E. McFarlin, Jr., 2622 E. 30th St., Des Moines, IA (US) 50317; David L. Henderson, 3541 NE. 56th Pl., Delaware Township, Berwick, IA (US) 50032

( * ) Notice: Subject to any disclaimer, the term of this patent is extended or adjusted under 35 U.S.C. 154(b) by 0 days.

(21) Appl. No.: 11/026,808

(22) Filed: Dec. 30, 2004

(65) Prior Publication Data
US 2005/0141977 A1 Jun. 30, 2005

Related U.S. Application Data (60) Provisional application No. 60/533,743, filed on Dec. 31, 2003.

(51) Int. Cl.
*B23C 7/00* (2006.01)
*B23C 5/20* (2006.01)
*B23B 5/22* (2006.01)

(52) U.S. Cl. .................. 409/234; 409/231; 279/83; 279/97

(58) Field of Classification Search ............... 409/234, 409/230, 231, 232; 279/83, 77, 97
See application file for complete search history.

(56) References Cited

U.S. PATENT DOCUMENTS

| | | | |
|---|---|---|---|
| 2,257,169 A | 9/1941 | Hopps | |
| 2,793,041 A | 5/1957 | Barbier et al. | |
| 3,091,474 A | 5/1963 | Boutros et al. | |
| 4,647,052 A * | 3/1987 | Butikofer | 279/83 |
| 5,096,212 A | 3/1992 | Walsh | |
| 5,348,319 A | 9/1994 | Stolzer | |
| 6,332,619 B1 | 12/2001 | DeRosa | |

* cited by examiner

*Primary Examiner*—Dana Ross
(74) *Attorney, Agent, or Firm*—McKee, Voorhees & Sease, P.L.C.

(57) ABSTRACT

An extension for a bit or cutter tool relative to a rotational power source. The extension includes a blind bore receiving the shank of the bit or cutter. The opposite end of the body has structure that can be operatively connected to the source of rotational power. A second bore through the side of the body intersects the first bore. The second bore has two portions. The inner-most portion has a smaller diameter and is internally threaded. The outer portion has a larger diameter and slidably receives a clamping member. Clamping member can be retained by a shoulder bolt and has an end that can enter into the blind bore to clamp the shank in place. Preferably the clamping member is a sleeve having a center bore and a concentric exterior. Another aspect of the invention includes a biasing means that biases the sleeve outward of the bore.

37 Claims, 6 Drawing Sheets

ROUTER OR CUTTER BIT CHUCK OR EXTENSION

This is a conversion of, and priority under 35 U.S.C. § 119 and/or 120 is claimed to, U.S. Provisional Application 60/533,743, filed Dec. 31, 2003.

INCORPORATION BY REFERENCE

The contents of U.S. Provisional Application 60/533,743, filed Dec. 31, 2003 are incorporated by reference herein in its entirety.

BACKGROUND OF THE INVENTION

1. Field of the Invention

The present invention relates to a chuck, or an extension useable with a chuck, for holding cutter or router bits.

2. Problems in the Art

Various machines are adapted for interchangeable tools. An example is a wood-working router. A chuck of the router is adapted to receive and fix a router bit shaft. There are a number of other types of machines that utilize such a chuck or an analogous structure.

The mechanism to fix the bit in the chuck must be durable and robust. It cannot allow longitudinal or rotational movement of the bit during operation, even when substantial forces are experienced by the working end of the bit. Any such movement would reduce the effectiveness of the tool or even be dangerous (e.g. a high speed bit could release and fly off).

A variety of methods exist for fixing a bit in a chuck. Standard designs for routers use arbor locks or factory two-wrench systems. Some examples can be seen in the following U.S. patents:

U.S. Pat. No. 3,091,474
U.S. Pat. No. 5,348,319
U.S. Pat. No. 5,096,212
U.S. Pat. No. 6,332,619

There are times when it is desirable to extend the working end of the bit from the machine. For example, in certain situations, it is desirable to extend the cutting or working end of a router bit farther from the factory chuck of the router than normal. A specific example is where the router is installed upside-down in a table, with the bit chuck at or near the table surface. Placing a standard router bit in the chuck extends the bit a distance above the table top. Even if there is some adjustability of the router or router chuck relative to the table top such that there can be some adjustment of the height of the bit above the table top, there are certain circumstances where it is desirable, or even necessary, that the working end of the router bit be higher than any available adjustment range of the bit in the normal chuck and router.

Although existing methods of fixing a bit in a chuck and allowing some adjustments of the chuck relative to a table top are adequate for many purposes, there still exists room for improvement in the art.

Attempts to extend the working end of the bit leave room for improvement in the art because of complexity in terms of manufacture or number of parts, and potential for failure or vibration. Many previous extensions use a standard threaded collet with an extended shank to extend the reach of the bit when needed. They are supplied with internal or external threaded means to compress either a nut or a peripheral set of moveable fingers, or a separate collet sleeve actuated by a nut threaded over the outside diameter of an extension body which, when tightened, compress the fingers of the sleeve onto the bit shank, thereby retaining it. These methods require the use of two wrenches or the arbor lock of the router to tighten and release the bit shank in the extension. They also added an extreme amount of length to the shank requiring substantial space to be fabricated to return the useable stroke of the router. Also, due to the extreme length and slim profile, they are prone to introducing a substantial amount of concentric rotating width into the spinning bit which creates vibration, both with the bit cutting and free running.

Therefore, an improved extension that deals with these problems is submitted to be needed in the art.

The above listed patents represent various ways of locking a bit shank into a chuck. They have the benefit of allowing single tool cutter changes without the use of the arbor locks or the factory two wrench system mentioned above. However, disadvantages of these designs include difficulty in manufacturing and inability to use standard and large shank bits. Also, the need for an individual chuck for each brand of router becomes apparent when the wide variety of collet designs used for each manufacturer are taken into account. These types of chucks also do nothing to extend the reach of the cutter when it is needed, such as on the Legacy Mill. Special extra-long bits are needed for these machines, which are hard to find and expensive when located.

Additionally, at least in U.S. Pat. Nos. 3,091,474 and 6,332,619, eccentric sleeves 26 and 209, respectively, are difficult to make and require extreme care by the user to ensure proper alignment and correct clamping. These sleeves are also oriented so that if the fastener should fail, the rotation of the bit shank will force the sleeve out of contact with the bit shank, thereby releasing the cutter from the machine. Other disadvantages to these designs are the difficulty of keeping the bore of the chucks concentric with the center line of the arbor due to the cone-shape formed on the bottom of the chuck to mate with the factory taper. Due to the clearance required to insert and remove the cutter when the bit is clamped in operating position, the center line of the bit is no longer concentric with the center line of the arbor on which it is mounted. They also have no means of retaining the bit in the chuck when used in a chuck-down vertical position. Assembly and repair is also hindered by the design of these chucks. The retention pins and spring rings used to hold the various components together are subject to catastrophic failure. If either the spring rings or the tension pins fail, the chucks are free to disengage from the arbor of the machine.

By referring to FIGS. 5 and 6 of U.S. Pat. No. 3,091,474, and FIG. 5 of U.S. Pat. No. 6,332,619, the eccentric nature of the sleeves is explicit. The bore through the sleeve is offset from the longitudinal axis of the sleeve.

U.S. Pat. No. 5,096,212 illustrates a clamping method using two sleeves 108 and 109 on a threaded screw 94 (See FIG. 17 of U.S. Pat. No. 5,096,212). This adds complexity and cost to that clamping system.

U.S. Pat. No. 5,348,319 utilizes a complex shaped member 12 inserted longitudinally into the chuck. Also a separate insert 16 is used to receive the bit shank 18. The complex shape 12 wedges against the exterior of collet 16 instead of the bit shank. This also is a complex arrangement and requires complex manufacturing of the chuck.

Vibration problems most acute with U.S. Pat. Nos. 3,091,474 and 6,332,619 cannot be machined out or calculated out because of the different bits and speeds used. Although the offset from the center line is relatively small, it can be enough to cause substantial vibration and unbalancing of the bit because the longitudinal axis of the shank of the bit is slightly offset from the longitudinal axis of the arbor.

SUMMARY OF THE INVENTION

It is therefore a principle object, feature, advantage and aspect of the present invention to provide an apparatus and method which improves over the state of the art.

Other features, advantages, options or aspects of the invention include an apparatus and method which:

a. is non-complex and economical to manufacture;

b. reduces cost and resources for repair or reconstruction;

c. can be used in either a cutting or router bit chuck or in an extension of the same;

d. minimizes the amount of effort needed to attach a bit or remove a bit, or replace a bit;

e. is relatively universal across most brands of routers which have the proper size collet.

These and other objects, features, advantages, and aspects of the present invention will become more apparent with reference to the accompanying specification.

BRIEF DESCRIPTION OF THE DRAWINGS

FIGS. 3A and 3B illustrate diagrammatically an elevation view of a standard in-table router with conventional bit chuck.

DETAILED DESCRIPTION OF EXEMPLARY EMBODIMENTS

To provide a better understanding of the invention, specific exemplary embodiments the invention can take will now be described in detail. Frequent reference will be taken to the accompanying drawings. Reference numerals will be used to indicate certain parts and locations in the drawings. The same reference numerals will be used to indicate the same parts and locations throughout the drawings, unless otherwise indicated.

Environment of Invention

Exemplary embodiments will be described in the context of a router 70 mounted in a table 80 such that router chuck 75 is oriented upwardly (see FIGS. 3A–B, 4A–B). A hole in the top of table top 80 allows access to the chuck to insert and fix a router bit 76 in chuck 75; and release and remove and/or interchange another bit. It is to be understood, however, that concepts of the invention embodied in the exemplary embodiments can be applied to other tools needing analogous replaceable working tools.

General Structure

Figure 1:
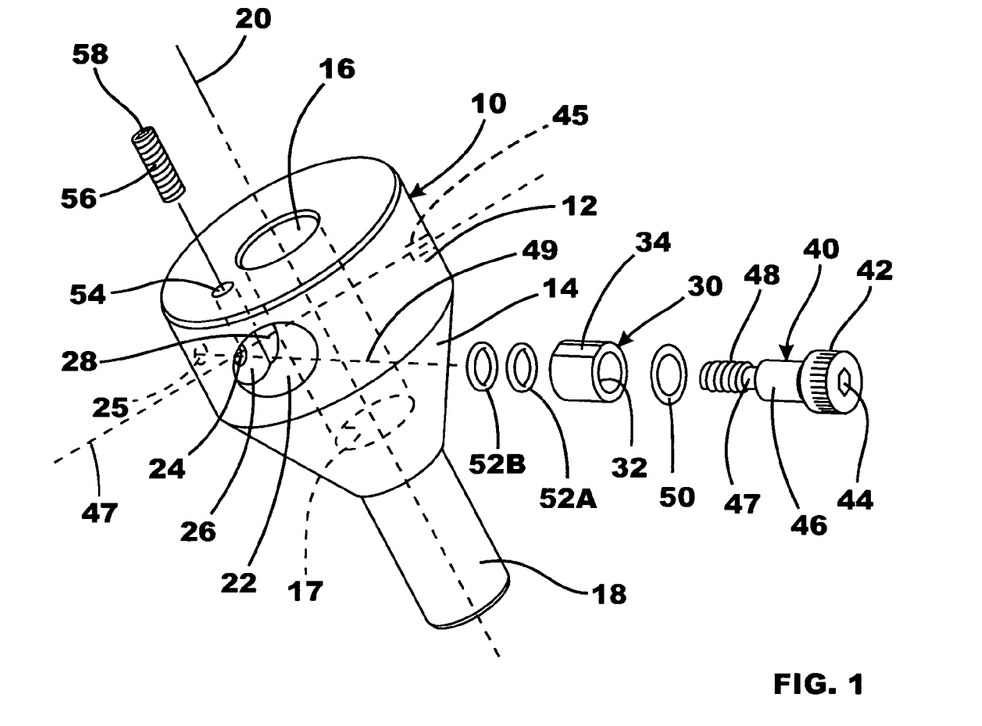
FIG. 1 is an enlarged perspective view in exploded form of a router or cutting bit extension according to one aspect of the invention.

FIG. 1 illustrates an exemplary embodiment of a router or cutter bit extension 10 according to the invention. Extension 10 is a generally solid piece of machined steel (e.g. stainless steel) having a cylindrical portion 12, a conical portion 14, and a shank 18. A blind bore 16 extends substantially through portions 12 and 14 along center line 20. Shank 18 is centered along center line (or longitudinal axis) 20.

Shank 18 is configured to fit into and lock into conventional chucks or arbors of most conventional routers 70. Blind bore 16 is configured to receive the shank of any number of conventional router bits. The internal diameter of blind bore 16 is therefore essentially the same as the external diameter of shank 18 in most cases. However, those dimensions could vary.

The shank of a bit inserted into blind bore 16 can be clamped by a shoulder bolt 40/sleeve 30 combination that can be inserted into tangential bore 22 in the side of cylindrical portion 12 of extension 10. As illustrated in FIG. 1, tangential bore 22 extends tangentially to blind bore 16 in such a manner and to such a distance that this major clamping bore 22 exposes part of blind bore 16 (see area indicated at reference number 28). The major portion of bore 22 terminates in a wall or step 26 that is orthogonal to the longitudinal axis of bore 22. A minor bore (threaded) 24 continues along the longitudinal axis of bore 22 from step 26 to the exterior (see reference numeral 25) of cylindrical portion 22.

Shoulder bolt 40 includes a head 42 with a hex socket 44 extending inwardly therein. Shoulder 46 extends from head 42. A reduced diameter terminal part of shoulder bolt 40 includes unthreaded portion 47 and threaded end 48.

Clamping sleeve 30 is approximately the length of shoulder 46 of shoulder bolt 40. It has a through-bore 32 having a diameter slightly larger than the outside diameter of shoulder 46 of shoulder bolt 40 such that sleeve 30 slides over shoulder 46 in a mating fashion but freely rotates thereon. Shoulder 46 is hardened and machined. End 48 and portion 47 of shoulder bolt 40 extend beyond sleeve 30 when installed in shoulder bolt 40. A thin metal washer 50 can be installed between sleeve 30 and head 42 to reduce wear by any friction between the two.

A combination of sleeve 30 on shoulder bolt 40 can be inserted into major bore 22 in extension 10 and threaded end 48 turned into minor threaded bore 24. Sleeve 30 is oriented such that flat 34 is parallel with the plane of the end of extension 10 (the plane of the opening into blind bore 16). A radius angle cut exists approximately centered 90 degrees clockwise at the innermost end of sleeve 30 and ends up coincident with opening 28 into blind bore 16, as will be further described below (but which cannot be seen in FIG. 1). By inward threading of shoulder bolt 40, the inner end of sleeve 30 is brought farther into opening 28. In this manner a portion of the inner end of sleeve 30 enters within the blind bore 16 and thus can exert clamping force on a bit shank in blind bore 16.

The basic concept of using a threadable bolt and sleeve having a portion that extends into the shank bore is described in such patents as U.S. Pat. Nos. 3,091,474 and 6,332,619, mentioned above. However, differences exist between those structures and that of extension 10.

First, through-bore 32 of sleeve 30 is generally centered along the longitudinal axis of sleeve 30. In other words, the wall thickness around through bore 32 is essentially the same around its circumference (except for the flat portion 34). This is in direct contrast to the decidedly eccentric shape of the sleeves of the above-mentioned patents.

Secondly, shoulder 46 of shoulder bolt 40 is hardened and of larger diameter than the remainder of portion 47 and 48 of the shaft or bolt 40.

Third, optionally an O-ring (elastomeric and resilient) 52 can be positioned between the inner end of sleeve 30 and step 26 inside extension 10. In FIG. 1, two O-rings 52A and B can be utilized. The diameter of the opening in the O-rings is slightly less than the diameter of portion 48 and 47 of bolt 40. When bolt 40/sleeve 30 is inserted into extension 10 and bolt 40 is threaded into bore 24, O-rings 52A and B compress between step 26 and the inner end of sleeve 30. This biases bolt 40/sleeve 30 outwardly to assist in deterring backup of bolt 40 or loosening of bolt 40. But additionally, when bolt 40 is somewhat loosened, O-rings 52A and B tend to bias it outwardly to assist in removal of the bit shank from blind bore 16. Conversely, when loosened, they also help deter the bolt/sleeve 40/30 combination from falling out of extension 10. It is to be understood that in this embodiment two O-rings are used. One could also be used or more than two. There are also alternative biasing members (e.g. springs) that could be used.

Additionally, a threaded bore 54 exists from the end surface of extension 10 parallel to through-bore 16 and in communication with main clamping bore 22 (see FIG. 1). A set screw 56 with a hex socket 58 is adapted to be threaded through bore 54 until its inner end abuts flat 34 of sleeve 30 when screw 40/sleeve 30 is installed. This primarily deters sleeve 30 from rotating and can assist in preventing longitudinal movement of sleeve 30 relative to bolt 40. Preferably set screw 56 is tightened enough to stop rotation but allow some longitudinal movement so that bit removal and insertion (and clamping) can be done with just loosening or tightening one thing—bolt 40.

Therefore, as can be seen, a simple, easy to manufacture combination exists for clamping a bit shank. One tool can be used to do so by simply rotating shoulder bolt 40.

Figure 2:
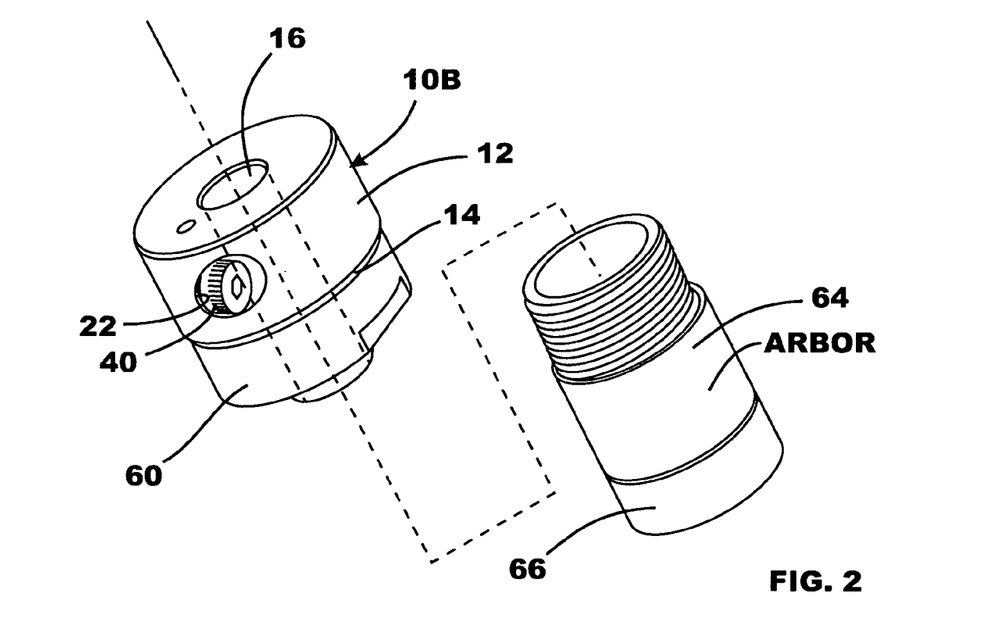
FIG. 2 is similar to FIG. 1 but shows a router or cutting bit chuck according to one aspect of the present invention.

FIG. 2 illustrates an alternative embodiment according to the invention. Instead of an extension having a shank 18 that could be fixed into a router chuck, the invention can be embodied into a chuck 10B. The clamping mechanism of shoulder bolt 40/sleeve 30, and the other structure described with regard to FIG. 1, is identical. The only difference is instead of a shank 18, chuck 10B would be connected operably to an arbor 60/62/64 arrangement that in turn is connected to a draw bar 66. Chuck 10B would therefore function like any conventional chuck (see descriptions of the same in U.S. Pat. Nos. 3,091,474 and 6,332,619). It would use standard structure for operative connection to the motor of the tool. Therefore this standard connection will not be further described, as it is well known in the art.

Figure 3A:
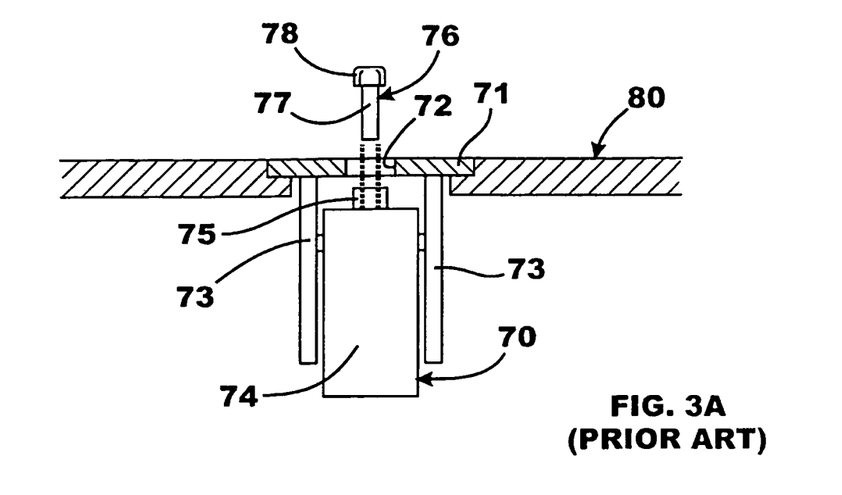
FIG. 3A shows the bit in exploded position from the chuck.
Figure 3B:
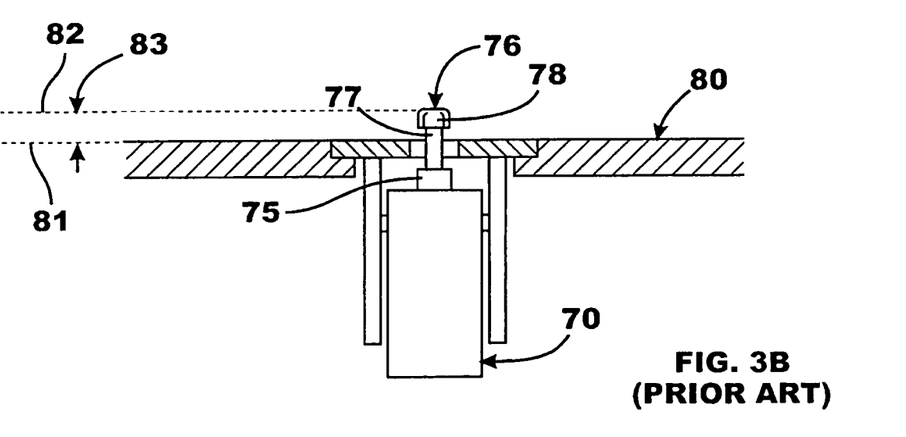
FIG. 3B shows the bit fixed into the chuck in operable position.

FIGS. 3A and B and 4A and B illustrate diagrammatically how extension 10 can be used. Normal in-table routers have a metal base plate 71 that seats into a mating circular cutout in the top of table 80 to hold router 70 in an inverted position. Supporting structure 73 extends from base plate 71 and is connected to the body or motor housing 74 of router 70. Chuck 75 is at the top of housing 74 and is operatively connected to the motor in housing 74. An opening 72 exists in base plate 71.

A bit 76, having a shank 77 and cutting head or working end 78, is insertable shank-first into chuck 75. Chuck 75 is then adjusted to grab shank 77 to hold bit 76 in operable position (see FIG. 3B). As indicated, router 70 is adjusted so that cutting head 78 extends above the plane of table top 80. For illustration, the plane of table top 80 is indicated at reference numeral 81. The plane of the top of cutting head 78 is indicated at reference numeral 82. The distance between planes 81 and 82 is indicated at reference numeral 83.

Figure 4A:
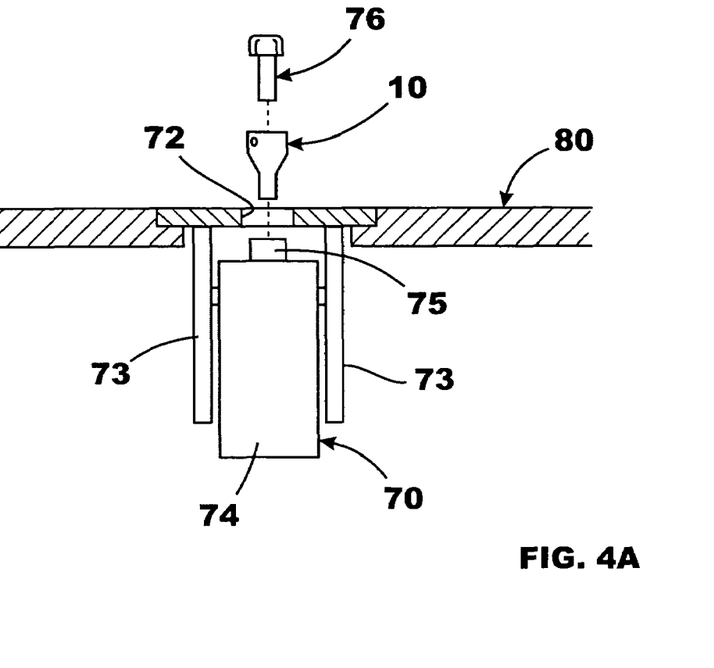
FIGS. 4A and 4B are similar to FIGS. 3A and 3B but show the embodiment of the extension of FIG. 1 relative to a conventional in-table router.
Figure 4B:
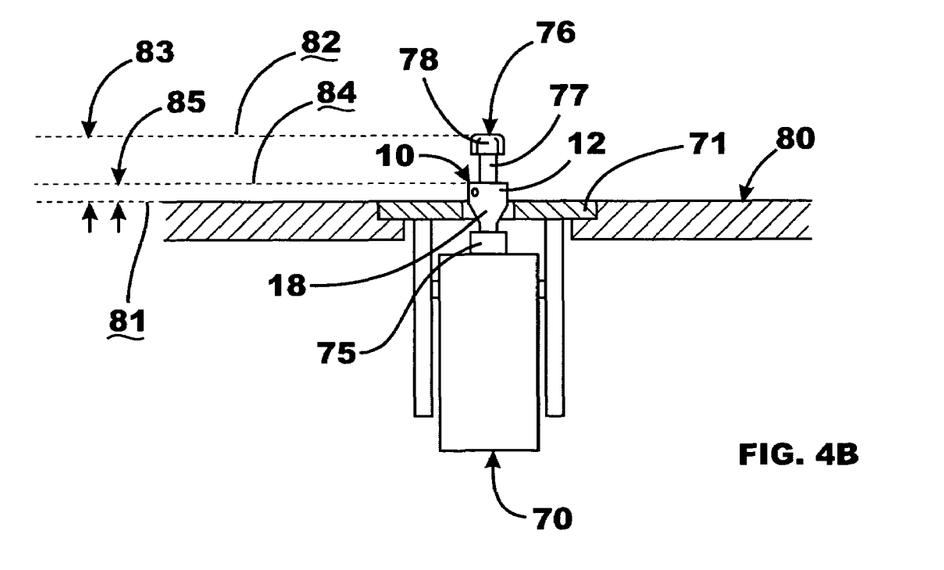

As previously briefly discussed, even though many routers have the capability of adjusting the distance between base plate 71 and chuck 75, and thus having some range of adjustability of the plane of the top of cutting head 78, there are certain circumstances where certain cutting bits require extension above plane 81 farther than router 70 can be adjusted. As illustrated in FIGS. 4A and B, extension 10 of FIG. 1 can be fixed into chuck 75 of router 70 and shank 77 of bit 76 fixed into extension 10. As diagrammatically illustrated in FIG. 4B, this would result in plane 83 being substantially higher than plane 83 of FIG. 3B. The top of extension 10, when inserted into chuck 75, is indicated at the plane indicated by reference numeral 84 in FIG. 4B. The difference between plane 81 and plane 83, when used in extension 10, would essentially be the length of extension 10 (approximately).

As stated, bit 76 can be installed into extension 10 with one tool quickly and easily. Its clamping structure robustly grips shank 77.

As can be appreciated, the length of extension 10 can be varied according to need or desire.

Additional Details Regarding Embodiment of Extension 10

Figure 5A:
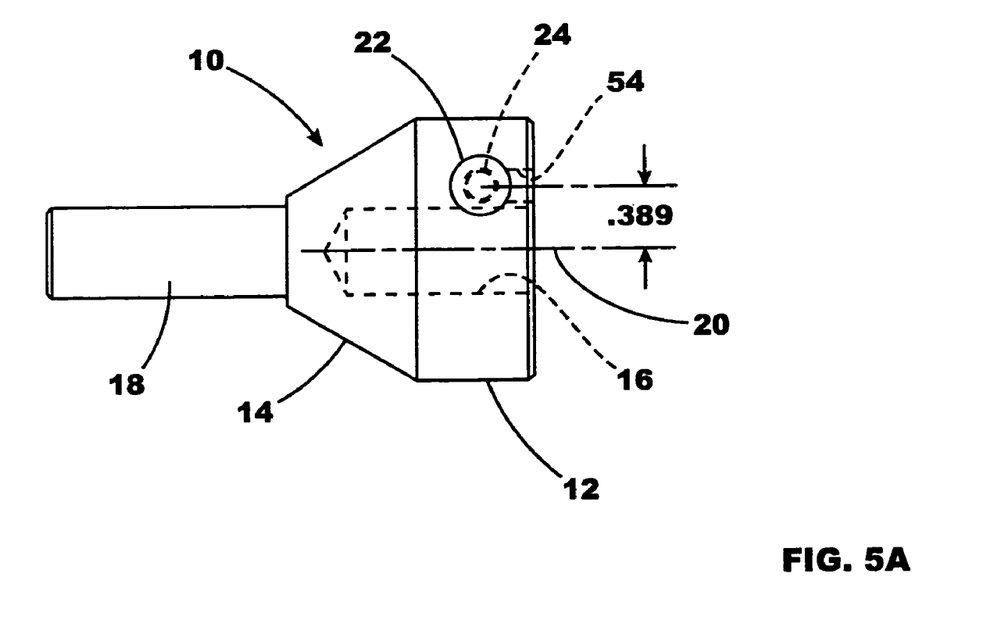
FIGS. 5A and 5B show a side elevation and elevation respectively of the extension of FIG. 1 illustrating dimensions and manufacturing techniques for one exemplary embodiment.

By reference to FIGS. 5A and B, 6A–C and 7, additional details regarding extension 10 are illustrated. Bore 24 is a 10-32 GH7 threaded hole. The center bore should be concentric within close tolerances. All diameters should also. It is to be understood that these are exemplary of one form extension 10 could take.

Figure 5B:
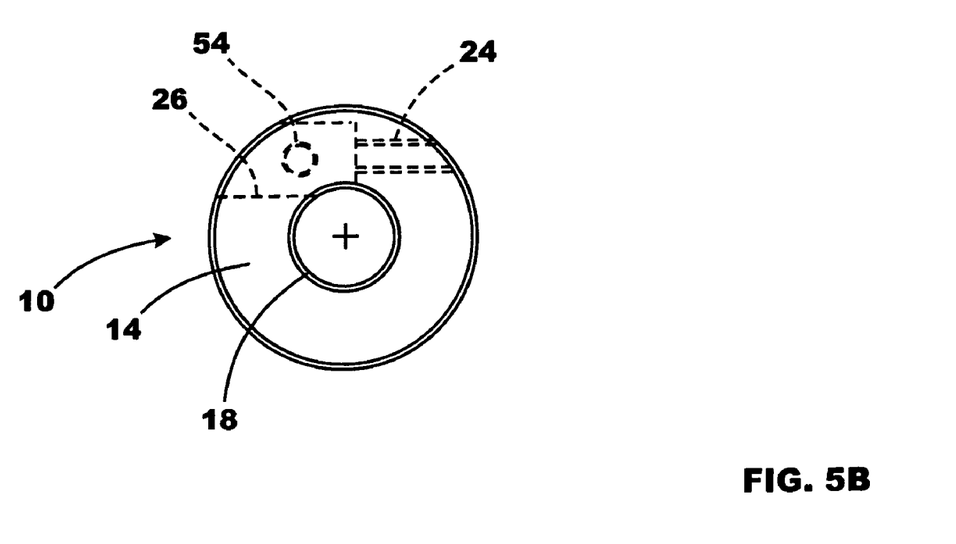

FIGS. 5A and B illustrate extension 10 body 12/14/18, as well as blind bore 16, major and minor clamping bores 22 and 24, and set screw bore 54.

Figure 6A:
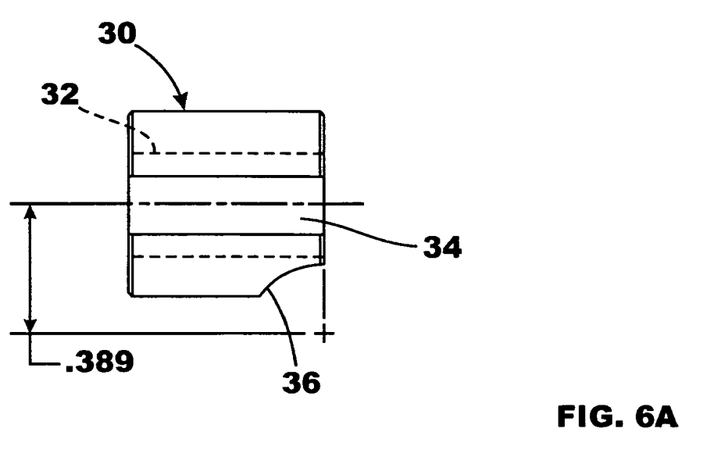
FIGS. 6A–C show, in isolation, enlarged views of a clamping sleeve used in the embodiment of FIGS. 1 and 5A–B.
Figure 6B:
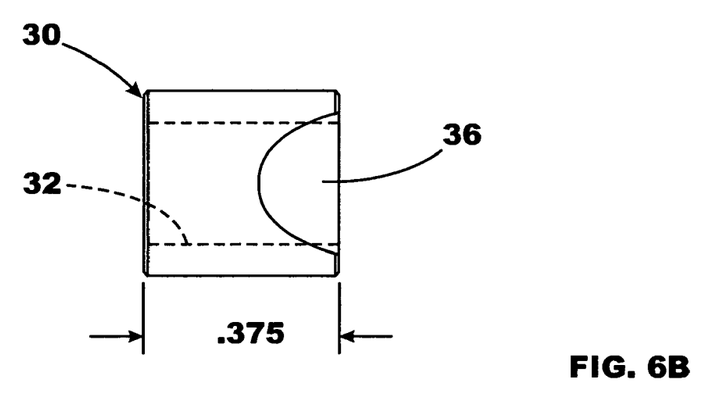
Figure 6C:
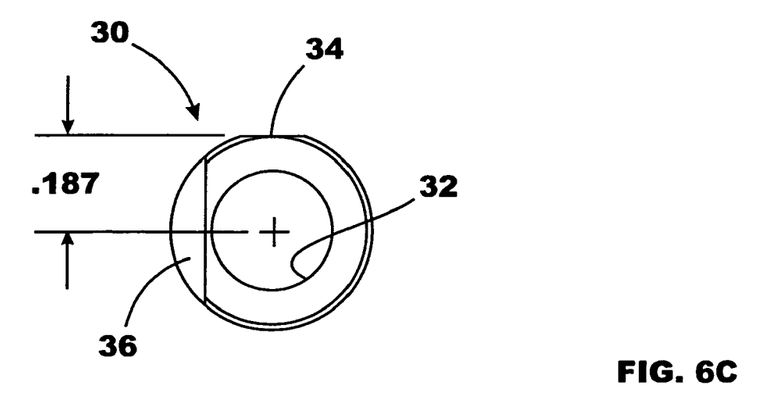

FIGS. 6A–C show an exemplary sleeve 30. In particular, the radius of machined portion 36 is shown in detail. Flat 34 can also be seen in more detail. Also, in this embodiment each opposite end edge is beveled (reference numeral 38).

Figure 7:
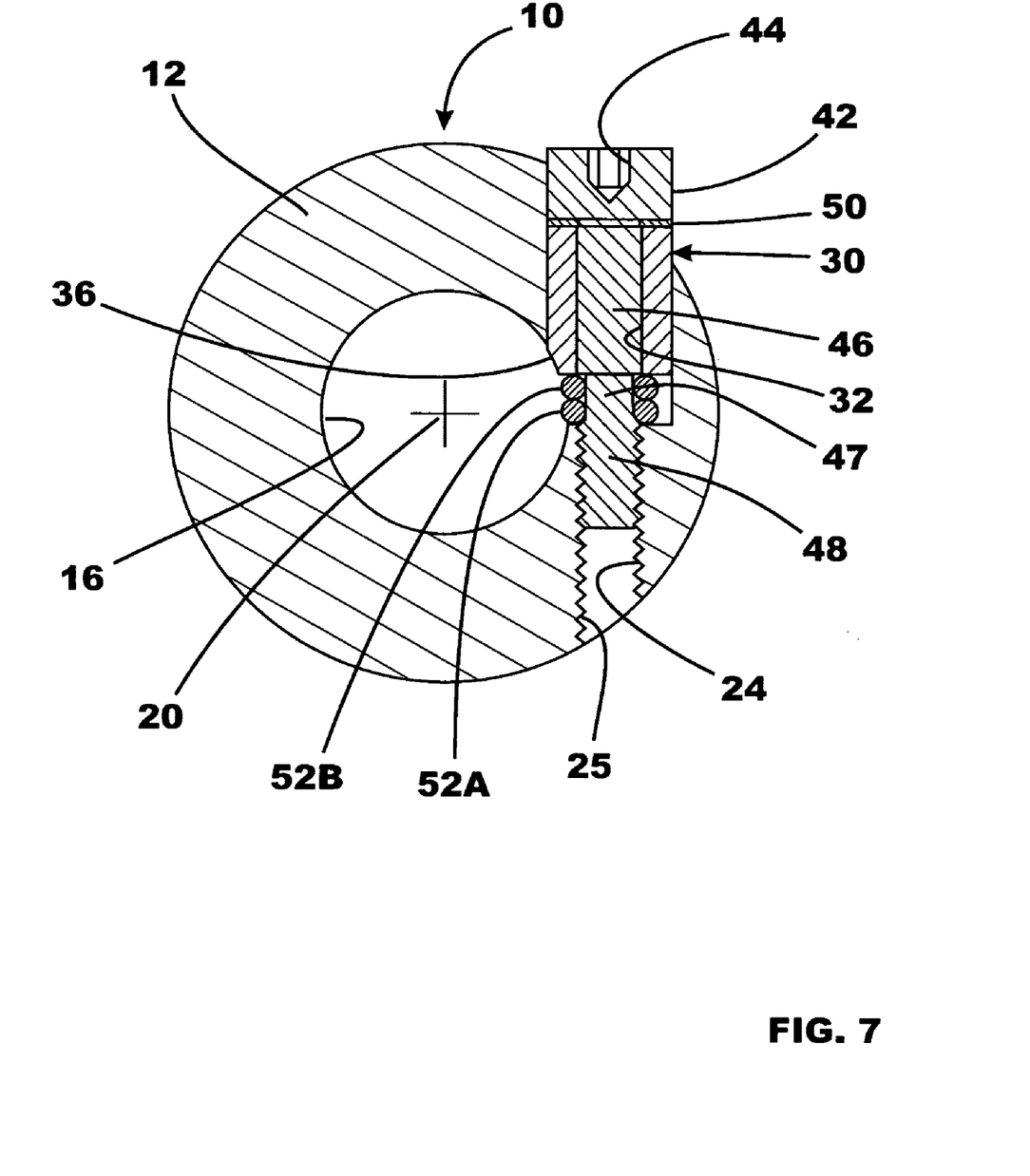
FIG. 7 is an enlarged sectional view taken along lines 7—7 of FIG. 5A.

FIG. 7 illustrates by sectional view bolt 40 and sleeve 30 assembled into extension 10.

Options and Alternatives

The foregoing exemplary embodiments are given by example only and not by limitation. Variations obvious to those skilled in the art will be included within the invention.

It can therefore be seen that extension 10 allows extension of a router bit outward of the base of a router or machine base plate to get added reach and allow easy bit changing with a single tool without using a factory collet or arbor lock, or two wrenches, when used in conjunction with table/hand-held/machine-mounted router. Its blind bore 16 can be sized to receive cutter bits or router bit shanks sized to fit in the collet of a conventional router or other machine. Its radial clamping mechanism, operated by a single tool, enables it to be used even by persons having less than full use of both hands. It also allows essentially universal use across all brands of routers which have the proper size collet. It does not depend on any threaded means other than the factory supplied collet and clamping means.

The designs are easy to manufacture due to a concentric clamping sleeve as opposed to an eccentric sleeve. The extension design is far more universal and allows a single size to be used across a wide variety of routers.

FIGS. 5A and B show additional details for one example of a bit chuck according to the invention. Variations are possible, such as would be obvious to those skilled in the art.

One optional feature that can be manufactured into extension 10 is as follows. As mentioned, clamping systems such as U.S. Pat. Nos. 3,091,494 and 6,332,619 have enough play in the bore that receives the bit shank that many times, when clamped, the longitudinal axis of the bit is moved off center of the longitudinal axis of the collet or arbor. This slight offset (even several hundredths or thousandths of an inch) can result in a wobble or vibration when the bit rotates. This is especially apparent at high speed rotations. To compensate for this, optionally the longitudinal axis of shank 18 of extension 10 can be offset from the longitudinal axis of blind bore 16 opposite opening 28 in main clamping bore 22 by approximately the same distance the shank 77 of bit 76 would be moved when turning down shoulder bolt 40 to clamp in bit 76. Because shanks 76 are essentially all the same diameter, the amount of movement can be averaged or approximated and, during manufacturing, the offset of shank 18 will align it with the operating longitudinal axis of shank 77 of bit 76 sufficiently to reduce or eliminate whipping or vibration. The center line of the bit would be concentric to the center line of the arbor when it is clamped into the extension and the extension is in turn clamped into the machine arbor/collet. This design and the mass of extension 10 help alleviate the whipping problem observed in extensions sold by others. Extension 10 can be made of fatigue-proof steel or other tough steels known in the art. Shoulder 46, and threaded fastener 40 with the matching bore and sleeve 30, provide a full bearing surface for torque-loading of the sleeve when clamped.

Another optional feature can be a balancing hole 45 (see FIG. 1) which can be a formed (e.g. by drilling or otherwise) cavity or void in the side of cylindrical portion 12 of extension 10. Hole 45 preferably is generally in the same plane as clamping screw or bolt 40 (see plane defined by lines 47 and 49 in FIG. 1). The function of balancing hole 45 is to compensate for the missing mass on the opposite side of cylindrical portion 12 caused by opening 22 and bore 24 that facilitate entry of clamping bolt 40 and sleeve 34 into cylindrical portion 12. By methods well known in the art (e.g., trial and error or a computer program that calculates any offset in mass), the size of hole 45 is selected to balance extension 10 along its longitudinal axis. The size of hole 45 therefore depends upon the size of any missing mass on the opposite side of extension 10, including the opening 64 for set screw 56. Of course, the design would take into account the mass of any structure normally inserted into the openings, including clamping screw 40, sleeve 45, set screw 56, and other parts, but is intended to be quite precise in balancing extension 10. In the embodiment shown in FIGS. 5A and B, hole 45 is approximately 7/32 inch in diameter and 3/16 inch deep.

As can be appreciated by those skilled in the art, the position of balancing hole 45 relative the opposite side of extension 10 may not be directly 180O. There could be an offset. As can be seen in FIG. 1, the missing mass caused by voids 22, 24, taken in combination, are somewhat complex. They do not represent a simple cylindrical bore directly or orthogonal into the side of extension 10. Therefore, balancing hole 45 might be offset a few degrees (e.g. 5°) on the opposite side of a plane through the longitudinal axis of extension 10 that lines up with wall 26. There is no set range of offset and it would be dependent upon the circumstances. But even with the general embodiment of FIG. 1, the offset could be slight, perhaps up to 15° or so.

Other methods for balancing extension 10 are possible. For example, a flat spot might be machined on the opposite side of extension 10 from opening 22. However, flat spots tend to create more complexity in achieving balance. Another possibility would be to add mass to the side of opening 22. Other methods are possible such as within the skill of those skilled in the art.

Main clamping bore 22 in which sleeve 30 slides is also sized to provide a full bearing surface to prevent deflection of sleeve 30, which maximizes sleeve 30 to bit shank 77 contact. Flat point set screw 56, combined with milled flat 34 on sleeve 30, provides an anti-rotation feature to sleeve 30. This also ensures maximum bit contact while aiding in the accurate milling of the radius in the edge of sleeve 30 for, again, maximum shank 76 contact. Sleeve 30 is also oriented to work with the rotation of the bit to affect a self-clamping or enhance clamping force provided by threaded fastener 40. Even if the fastener 40 should fail, the rotation effect of shank 77 on sleeve 30 will work to draw sleeve 30 into the body of extension 10 and not outward away from bit shank 77, therefore acting as a self-restraining mechanism for bit retention.

Resilient ring or rings 52 provide a method of biasing sleeve 30 to a released position when clamping force is released. It (or they) also act to retain the bit in extension 10 when used in a bit-down vertical position, such as a Legacy Mill or pin routing machine.

Since no parts but the factory collet components are used to retain extension 10 to the arbor, the chances of failure or release from the machine arbor are greatly reduced. Balancing is greatly enhanced due to the fact that the clamp position of the bit is concentric with the extension shank center line and therefore the machine arbor center line. This eliminates what can be called variable mass from the balancing equation, making balancing easier and far more accurate. The variable mass is created by the use of various diameters and lengths of bits, and also the weight of these bits.

As stated, the invention can be used for routers and analogous uses. By analogous uses it is meant any rotary tool that is gripped by a collet-like member or chuck. Shaping machines are another example. The primary application described above is with table or machine mounted routers of either the fixed base or plunge router type. But this is not limiting to its use.

In operation, extension 10 is mounted to the factory supplied arbor or into the factory supplied collet of the router and the bolt 40 tightened. Extension 10 is then checked for run out, which a maximum is supplied with instructions for use. If the run out is found to be excessive, the collet is then loosened and extension 10 or collet sleeve are repositioned and the collet retightened. Run out is again checked and the process is repeated until the run out is brought to the absolute minimum. The router bit of choice is now selected and inserted into the bore of the extension. A supplied Allen wrench is used to rotate the clamping screw which, in turn, applies the clamping force to the clamping sleeve which bears on the shank of the bit, effectively clamping the bit into working position in the extension 10. To remove the bit, the clamping screw is rotated counterclockwise, which releases the clamping force of sleeve 30. The resilient members 52 can then bias the sleeve to the unclamped position and the bit can be withdrawn.

In one embodiment a combination of features and aspects could include:

an extension with a body, a round tool shank sized and shaped at its first end design to be inserted into the factory collet/chuck of a woodworking router and be retained by the collet, a blind unthreaded bore at the opposite end into which the shank of the router bit can be inserted, a peripheral clamping mechanism perpendicular to said bore, said clamping mechanism consisting of, a bore perpendicular to the blind bore, said bore being situated so as to work with the forces of rotation of the bit when in use allowing the clamping mechanism to self tighten to some degree, said bore being of two dimensions in cross section, one section of said bore being sized to receive a clamping sleeve, this first bore being located so as to allow the sleeve edge to penetrate the blind bore for the shank, the remainder being of a reduced size to accommodate the threaded clamping method, the reduced size remaining bore containing internal threads, a threaded clamping method to load and retain the sleeve, a sleeve of uniform wall thickness and being less than half the depth of the bore in length, in which the sleeve is inserted and retained, the sleeve having a flat machined onto it, the sleeve having a radius perpendicular to the centerline machined onto it at one end, a washer/ring positioned under the head of the threaded clamping method to reduce wear and friction, a resilient ring or rings to bias the sleeve to an unclamped position, said rings also acting to retain the bit when the router is used in the chuck down position, the threaded clamping method includes a hex shaped recess in its first end, the threaded clamping method includes a shoulder about its center line biased to an end upon which the sleeve resides, the threaded clamping method which includes at its second end a threaded portion, an anti rotation method, the anti-rotation/and secondary retention means method consisting of a bore, the bore being located in the same face as the blind bore, the bore being in the periphery of the top face, the bore being threaded or smooth, the bore intersecting the periphery clamping bore, the bore being blind or through.

However, it is to be understood that many of the above aspects are optional. Variations of the above-combination can be practiced, including or not including certain of the aspects, achieve different functions and advantages. And variations obvious to those skilled in the art can be made to any of the features or aspects. The invention is defined solely by the claims appended hereto.

Also included in the invention is a method of machining which accurately locates the blind bore centerline and the center line of the tool's arbor/collet, which eliminates or reduces the off-center rotation of the cutter/bit which reduces vibration and makes balancing the assembly consistent regardless of the mass inserted into the blind bore (i.e., size, length and diameter of cutter bit).

What is claimed is:

1. An extension for use between a bit and a power tool comprising:
   a. a body having a longitudinal axis, a bit receiving end, and an opposite end adapted to be operatively connected to a power tool;
   b. the body having a first space extending from an opening in the bit receiving end inwardly along the longitudinal axis for slidably receiving the shank of a bit;
   c. a second space entering the body and intersecting with said first space;
   d. a threaded bore in the body;
   e. a clamping member slidably insertable into the second space and moveable such that a portion of the clamping member enters the first space to clamp a bit
   f. the clamping member comprising;
      i. a shoulder bolt having a head of a diameter, a shoulder of a diameter smaller than the head, and a shaft with a smaller diameter than the shoulder, a portion of the shaft being threaded for mating insertion into the threaded bore in the body;
      ii. a sleeve having a longitudinal axis and a through bore between opposite ends along the longitudinal axis for mating, slidable insertion over the shoulder of the bolt;
      iii. so that the shoulder provides a bearing surface for the sleeve larger than the threaded shaft, a surface of the sleeve can be pulled into the first space for clamping by turning the shoulder bolt into the threaded bore in the body, and the sleeve is not eccentric to the bore through it.

2. The extension of claim 1 wherein the shoulder provides a full bearing surface for the sleeve for torque loading when the clamping member clamps a bit.

3. The extension of claim 2 wherein the shoulder is made of hardened metal.

4. The extension of claim 1 wherein the opposite end comprises a shank.

5. The extension of claim 1 wherein the opposite end comprises a threaded connection for a collet.

6. The extension of claim 1 wherein the first space is a bore that surrounds the center line of the body.

7. The extension of claim 1 wherein the second space comprises a second bore that is transverse to the first space.

8. The extension of claim 7 wherein the second bore has first and second portions, the first portion being larger in perimeter dimensions than the second portion.

9. The extension of claim 8 wherein the first portion has a larger diameter than the second portion and the transition between the first and second portion comprises a step.

10. The extension of claim 1 wherein the clamping member further comprises a retaining member that is adapted to hold the sleeve in a second space.

11. The extension of claim 10 wherein the sleeve has a longitudinal axis or center line, the bore is concentric to the center line, and the exterior surfaces concentric with the center line.

12. The extension of claim 10 wherein the retaining member is a shoulder bolt having a head, a threaded opposite end, and a shoulder therebetween, the threaded opposite end being threadably insertable into internal threads in the second portion of the second space.

13. The extension of claim 12 further comprising a biasing means positioned between the step and the first end of the sleeve, the shoulder abutting the second end of the sleeve so that tightening of the bolt urges the sleeve against the biasing means.

14. The extension of claim 13 wherein the biasing means comprises an elastomeric member.

15. The extension of claim 14 wherein the elastomeric member is a ring.

16. The extension of claim 15 wherein the elastomeric member comprises a plurality of rings.

17. The extension of claim 1 wherein the second space is generally tangential to the first space.

18. The extension of claim 17 wherein the intersection between the first and second spaces comprises a small shared space.

19. The extension of claim 18 wherein the clamping member can move into the shared space.

20. The extension of claim 1 further comprising a third space in the body extending from an opening in the bit receiving end into intersection with the second space.

21. The extension of claim 20 wherein an anti-rotation member is insertable into the third space, the anti-rotation member comprising a threaded member, the third space comprising a complementary threaded bore, and the anti-rotation member being moveable through the third space into abutment with the clamping member to resist rotation of the clamping member in the second space.

22. An extension for use between a bit and a power tool, comprising:
   a. a first bore into a body adapted to receive a bit;
   b. a second bore into the body generally tangent to the first bore;
   c. a threaded bore in the body;
   d. a clamping sleeve with first and second ends and a longitudinal axis, a bore along the longitudinal axis, and an exterior that is concentric with the longitudinal axis;
   e. a shoulder bolt comprising a head of a diameter, a shoulder of smaller diameter than the head, and a threaded portion of smaller diameter than the shoulder the shoulder bolt insertable through the bore in the clamping sleeve to retain the sleeve in the second bore and provide clamping action for a bit in the first bore, when inserted over the shoulder of the shoulder bolt.

23. The extension of claim 22 further comprising a biasing member between the sleeve and the body to bias the sleeve away from the force of the bolt.

24. The extension of claim 22 wherein the bolt is a shoulder bolt, the shoulder providing a full bearing surface for the sleeve.

25. The extension of claim 24 wherein the shoulder of the shoulder bolt is hardened.

26. The extension of claim 22 wherein the exterior of the sleeve has a flat section along its longitudinal axis.

27. The extension of claim 26 further comprising a set screw insertable through a third bore through the body in alignment with the flat to deter rotation of the sleeve in the second bore.

28. The extension of claim 22 further comprising a balancing void.

29. The extension of claim 28 wherein the balancing void comprises a bore on a generally opposite side of the body from the second bore.

30. The extension of claim 29 wherein generally opposite is 180°+ or −15°.

31. The extension of claim 28 wherein the balancing void comprises a portion of the body generally opposite the second bore where mass has been removed.

32. The extension of claim 28 further comprising a balancing mass added generally at or near the side of the body with the second bore.

33. An extension for use between a bit and a power tool, comprising:
   a. a first bore in a body;
   b. a second bore in the body;
   c. a clamping sleeve with first and second ends and a longitudinal axis, a bore along the longitudinal axis, and an exterior that is concentric with the longitudinal axis;
   d. a bolt insertable into the second space to retain the sleeve;
   e. a biasing member adapted to apply biasing pressure against movement of the bolt towards the biasing member.

34. The extension of claim 33 wherein the biasing member comprises an elastomeric member positioned in the second bore.

35. The extension of claim 34 wherein the elastomeric member comprises an 0-ring.

36. A power tool adapted for rotating a bit having a shank that is releasably insertable into the power tool, the improvement comprising:
   a. a bit extension having the first end adapted to releasably slidably receive the shank of the bit and a second opposite end having structure to operatively releasably attach to the power tool;
   b. a first bore longitudinally into the extension for receiving a bit shank;
   c. a second bore generally tangential to the first bore and intersecting the first bore;
   d. the second bore having first and second portions, the first portion receiving a clamping sleeve having a first end adapted to enter the intersection of the first and second bores and a second end adapted for abutment a retaining member;
   e. the second portion of the second bore having a smaller diameter than the first portion and being internally threaded, the transition between the first and second portions comprising a step;
   f. a biasing means placed between the step and the sleeve to urge the sleeve in an opposite direction when it is moved to and compresses the biasing means;
   g. the sleeve having a central bore with the exterior of the sleeve being concentric to the central bore.

37. An extension for use between a working tool having a shank and a source of rotational power, comprising:
   a. a body having first end and a blind bore adapted to receive working tool shank extending from the first end inwardly of the body;
   b. a second end of the body adapted for operable connection to the source of rotational power;
   c. a releasable clamp mechanism adapted to clamp the shank of the working tool in the body comprising;
      i. a clamping bore in the body which intersects with the blind bore, the clamping bore comprising an entrance opening; a first portion, a second, internally threaded portion smaller in cross section than the first portion, and a step between the first and second portions;
      ii. a clamping sleeve having a longitudinal axis, and first and second ends and a bore along the longitudinal axis;
      iii. a shoulder bolt having a distal end adapted to thread into the second section of the clamping bore, and intermediate portion of larger cross sectional diameter comprising a shoulder adapted to provide a bearing surface for the clamping sleeve.

* * * * *

UNITED STATES PATENT AND TRADEMARK OFFICE
CERTIFICATE OF CORRECTION

PATENT NO. : 7,172,377 B2 Page 1 of 1
APPLICATION NO. : 11/026808
DATED : February 6, 2007
INVENTOR(S) : Mc Farlin, Jr.

It is certified that error appears in the above-identified patent and that said Letters Patent is hereby corrected as shown below:

<u>Col 12, Claim 36, line 33:</u>
After "abutment" insert --to--

Signed and Sealed this

Third Day of April, 2007

JON W. DUDAS
*Director of the United States Patent and Trademark Office*